(12) United States Patent
Bahl et al.

(10) Patent No.: US 6,782,422 B1
(45) Date of Patent: Aug. 24, 2004

(54) SYSTEMS AND METHODS FOR RESYNCHRONIZATION AND NOTIFICATION IN RESPONSE TO NETWORK MEDIA EVENTS

(75) Inventors: Pradeep Bahl, Redmond, WA (US); Timothy M. Moore, Bellevue, WA (US); Arun Ayyagari, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 825 days.

(21) Appl. No.: 09/652,501

(22) Filed: Aug. 31, 2000

Related U.S. Application Data (63) Continuation-in-part of application No. 09/556,764, filed on Apr. 24, 2000, now abandoned.

(51) Int. Cl.$^7$ .............................................. G06F 15/173
(52) U.S. Cl. ........................................ 709/224; 709/220
(58) Field of Search ................................ 709/224, 220, 709/221, 227; 714/1, 4, 25

(56) References Cited

U.S. PATENT DOCUMENTS

| | | | |
|---|---|---|---|
| 5,185,860 A | | 2/1993 | Wu |
| 5,680,326 A | | 10/1997 | Russ et al. |
| 5,917,997 A | * | 6/1999 | Bell et al. ...................... 714/4 |

(List continued on next page.)

OTHER PUBLICATIONS

*Specification of the Bluetooth System*, v.1.0B, Dec. 1, 1999.
Riku Mettala et al., *Bluetooth Protocol Architecture* (White Paper), v1.0, Nokia Mobile Phones, Sep. 29, 1999.
Brent Miller et al., *Mapping Salutation Architecture APIs to Bluetooth Service Discovery Layer* (White Paper), v. 1.0, IBM Corporation, Jul. 1, 1999.

IEEE Standard, 802.11, *Part 11: Wireless LAN Medium Access Control (MAC) and Physical Layer (PHY) Specifications*, 1$^{st}$ Ed. 1999, and Supplements 802.11a–1999 and 802.11b–1999.
Bob O'Hara and Al Petrick, *IEEE 802.11 Handbook A Designer's Companion*, Dec. 1999.
C. Rigney et al., RFC 2865, "Remote Authentication Dial in User Service (Radius)", The Internet Society, Jun. 2000.
B. Aboda and D. Simon, RFC 2716, "PPP EAP TLS Authentication Protocol", The Internet Society, Oct. 1999.
L. Blunk and J. Vollbrecht, RFC 2284, PPP Extensible Authentication Protocol (EAP), The Internet Society, Mar. 1998.
IEEE 802.11 *Security White Paper*, v0,1, Windows Network Infrastructure team, Microsoft Corporation, Mar. 15, 2000.
T. Muller, *Bluetooth Security Architecture* (White Paper), v.1.0, Jul. 15, 1999.
IEEE 802.1X *Supported Scenario*, Windows Network Infrastructure team, Microsoft Corporation, v0.1, Apr. 17, 2000.
Tamvaclis C., "QOS Driven Routing in Packet Switched Networks of Multiple Transmission Media", Agard Conference Proceedings, Neuilly Sur Seine, France, Oct. 4, 1993, p. 21–28.

(List continued on next page.)

*Primary Examiner*—Zarni Maung
(74) *Attorney, Agent, or Firm*—Leydig, Voit & Mayer, Ltd (57) ABSTRACT

The invention detects and responds to events occurring on a computer network medium. When a network media event is detected, network parameters are adjusted, if possible, to adapt to the new circumstances brought about by the event, and traffic may be rerouted if that is appropriate. High-level protocol drivers and network-aware applications are notified of the event so that they may adapt to the changed network circumstances. Sometimes, as a result of the network media event, the computer communicates with other devices on the network to discover the state of network entities, network elements, and services.

12 Claims, 4 Drawing Sheets

U.S. PATENT DOCUMENTS

| | | | |
|---|---|---|---|
| 5,991,771 A * | 11/1999 | Falls et al. .................. | 707/202 |
| 6,092,121 A | 7/2000 | Bennett et al. | |
| 6,134,671 A * | 10/2000 | Commerford et al. ......... | 714/4 |
| 6,138,159 A * | 10/2000 | Phaal ........................ | 709/226 |
| 6,151,505 A | 11/2000 | Larkins et al. | |
| 6,209,089 B1 * | 3/2001 | Selitrennikoff et al. ........ | 713/2 |
| 6,225,944 B1 | 5/2001 | Hayes | |
| 6,236,652 B1 | 5/2001 | Preston et al. | |
| 6,269,417 B1 | 7/2001 | Mahalingam | |
| 6,295,455 B1 | 9/2001 | Fischer et al. | |
| 6,314,455 B1 * | 11/2001 | Cromer et al. .............. | 709/217 |
| 6,353,854 B1 * | 3/2002 | Cromer et al. .............. | 709/224 |
| 6,424,639 B1 | 7/2002 | Lioy et al. | |
| 6,473,407 B1 * | 10/2002 | Ditmer et al. .............. | 370/252 |
| 6,477,576 B2 | 11/2002 | Angwin et al. | |
| 6,556,660 B1 | 4/2003 | Li et al. | |
| 6,560,650 B1 * | 5/2003 | Imai ........................... | 709/227 |
| 6,581,166 B1 * | 6/2003 | Hirst et al. .................... | 714/4 |
| 6,587,970 B1 * | 7/2003 | Wang et al. ................. | 714/47 |
| 6,615,276 B1 | 9/2003 | Mastrianni et al. | |
| 2002/0167919 A1 | 11/2002 | Marples et al. | |
| 2003/0110293 A1 | 6/2003 | Friedman et al. | |

OTHER PUBLICATIONS

Karavassilis, N, "Highly Survivable Communications: Complementary Packet Switched Networks", Advisory Group for Aerospace Research and Development, Oct. 4, 1993, p. 1–13.

* cited by examiner

SYSTEMS AND METHODS FOR RESYNCHRONIZATION AND NOTIFICATION IN RESPONSE TO NETWORK MEDIA EVENTS

This application is a continuation-in-part of application Ser. No. 09/556,764, filed on Apr. 24, 2000, now abandoned.

TECHNICAL FIELD

This invention relates generally to computer networks and, more specifically, to computers that respond to network media events and inform applications of those events.

BACKGROUND OF THE INVENTION

Computers that are able to sense when they are connected to a network and when that network connection comes up or goes down are called "media sense aware." Cisco Corporation, for example, builds this awareness into some of its products. These products use hardware to detect link failures, and, upon detection, they update their routing tables to route traffic away from the failed link and then inform other routers of the updated tables. Media sense awareness is also very useful in other common computing scenarios. For example, when a non-media sense aware computer's link is disconnected from one network and connected to another, an application that transmits secure information may not realize the change and may inadvertently leak that secure information out onto the new network. Likewise, a non-media sense aware computer that obeyed the bandwidth reservation guarantees given by a Quality of Service manager on its previous network may inadvertently violate the bandwidth guarantees on the new network.

Mobile computers are specially sensitive to problems if they are not media sense aware because they are often moved from one network to another or are disconnected from all networks. If the computer is not media sense aware, it may begin to operate on the new network with an obsolete network configuration, resulting in certain applications that communicate over the network becoming non-responsive or uncomfortably slow. For example:

The computer disconnects from a network. Applications that are using the network continue to send packets which time out, resulting in retries by the network protocol or by the application. Because retries are often exponentially backed off, these unnecessary timeouts and retries give rise to sluggish application behavior and a bad user experience.

The computer is disconnected from one network and connected to a different network. The protocol stack continues to use old network addresses even though they are not valid on the new network. This case has the same effect as the one above: sluggish application behavior and a bad user experience.

While some-computers are media sense aware, their awareness is restricted to discarding their network address on a media disconnect and then seeking a new address when the network connection comes up. These computers are oblivious to media events beyond disconnects and connects and are therefore very slow to react to such events because they must wait for a timer to expire before inquiring about the status of the network connection. Because they will not be informed when a situation changes, they may have to periodically poll for information about the situation and such polling consumes resources (battery power, for example, is a precious resource on small devices such as PDAs, handheld computers, etc.), both on the polling device and possibly on the network if the polls are sent to remote devices.

SUMMARY OF THE INVENTION

The present invention expands on the basic functionality of media sense aware computers to allow for more proactive and intelligent behavior by recognizing a broader range of network media events than simple disconnect and connect. When a network media event is detected, network parameters are adjusted, if possible, to adapt to the new circumstances brought about by the event. High-level protocol drivers are notified of the event, as are any network-aware applications, and traffic may be rerouted if that is appropriate. Sometimes, as a result of the network media event, the computer communicates with other devices on the network to discover the state of network entities, network elements, and services.

BRIEF DESCRIPTION OF THE DRAWINGS

The invention may be best understood from the following detailed description taken in conjunction with the accompanying drawings of which.

DETAILED DESCRIPTION OF THE INVENTION

Turning to the drawings, wherein like references numerals refer to like elements, the invention is illustrated as being implemented in a suitable computing environment. The following description is based on possible embodiments of the invention and should not be taken as limiting the invention in any way.

Overview of a General-Purpose Computer

Figure 1:
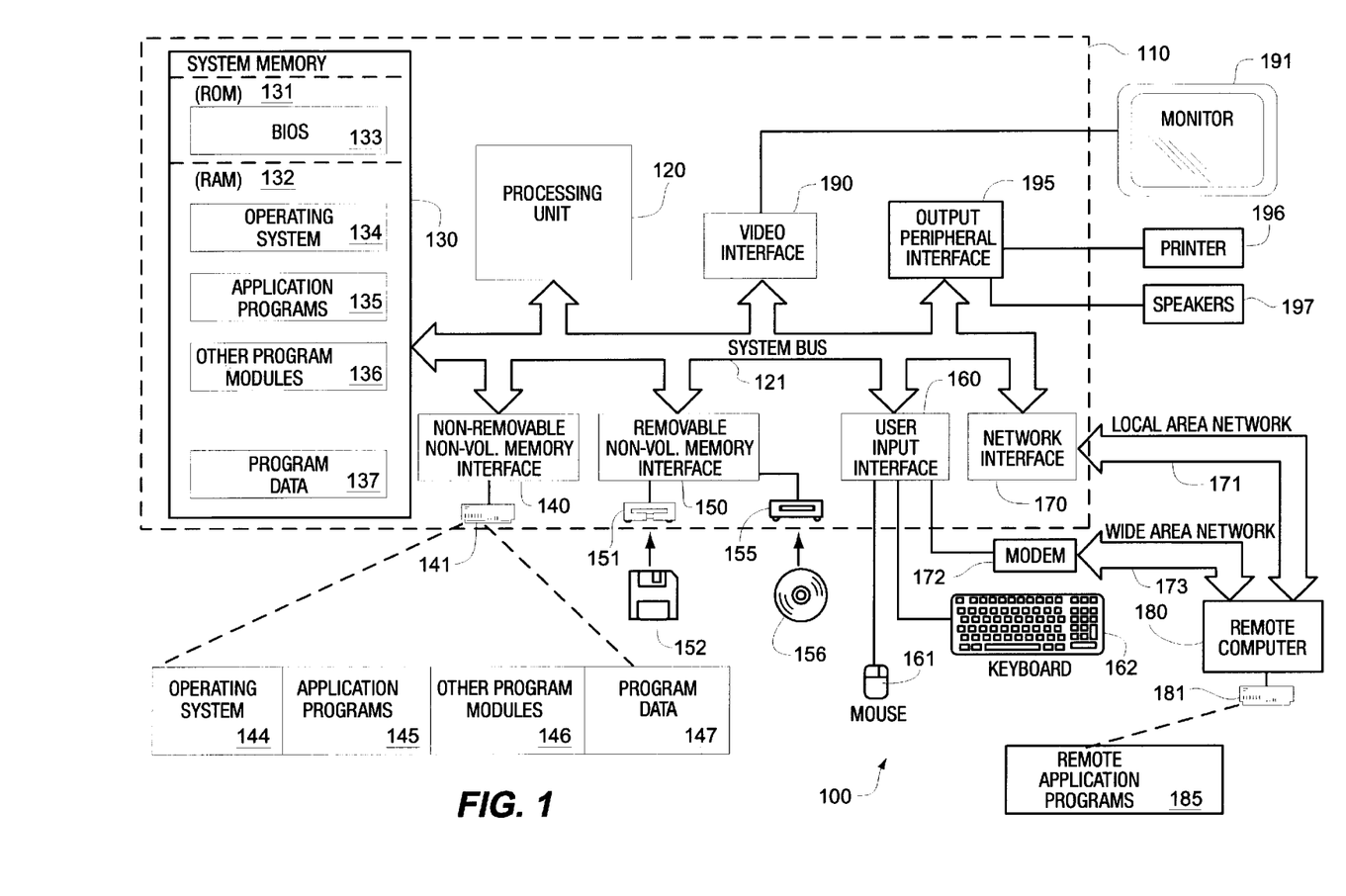
FIG. 1 is a block diagram generally illustrating an exemplary computer system which may support the present invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general-purpose or special-purpose computing system environments or configurations. Examples of well-known computing systems, environments, and configurations that may be suitable for use with the invention include, but are not limited to, personal computers, server computers, hand-held or laptop devices, personal digital assistants, multiprocessor systems, microprocessor-based systems, set top boxes, programmable consumer electronics, network PCs, minicomputers, mainframe computers, and distributed computing environments that include any of the above systems or devices.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

The computer 110 typically includes a variety of computer-readable media. Computer-readable media can be any available media that can be accessed by the computer 110 and include both volatile and nonvolatile media, removable and non-removable media. By way of example, and not limitation, computer-readable media may include computer storage media and communications media. Computer storage media includes both volatile and nonvolatile, removable and non-removable media implemented in any method or technology for storage of information such as computer-readable instructions, data structures, program modules, or other data. Computer storage media include, but are not limited to, random-access memory (RAM), read-only memory (ROM), EEPROM, flash memory, or other memory technology, CD-ROM, digital versatile disks (DVD), or other optical disk storage, magnetic cassettes, magnetic tape, magnetic disk storage, or other magnetic storage devices, or any other medium which can be used to store the desired information and which can be accessed by the computer 110. Communications media typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media include wired media such as a wired network and a direct-wired connection and wireless media such as acoustic, RF, optical, and infrared media. Combinations of the any of the above should also be included within the scope of computer-readable media.

The system memory 130 includes computer storage media in the form of volatile and nonvolatile memory such as ROM 131 and RAM 132. A basic input/output system (BIOS) 133, containing the basic routines that help to transfer information between elements within the computer 110, such as during start-up, is typically stored in ROM 131. RAM 132 typically contains data and program modules that are immediately accessible to or presently being operated on by processing unit 120. By way of example, and not limitation, FIG. 1 illustrates an operating system 134, application programs 135, other program modules 136, and program data 137. Often, the operating system 134 offers services to applications programs 135 by way of one or more application programming interfaces (APIs) (not shown). Because the operating system 134 incorporates these services, developers of applications programs 135 need not redevelop code to use the services. Examples of APIs provided by operating systems such as Microsoft's "WINDOWS" are well known in the art.

The computer 110 may also include other removable/non-removable, volatile/nonvolatile computer storage media. By way of example only, FIG. 1 illustrates a hard disk interface 140 that reads from and writes to non-removable, nonvolatile magnetic media, a magnetic disk drive 151 that reads from and writes to a removable, nonvolatile magnetic disk 152, and an optical disk drive 155 that reads from and writes to a removable, nonvolatile optical disk 156 such as a CD ROM. Other removable/nonremovable, volatile/nonvolatile computer storage media that can be used in the exemplary operating environment include, but are not limited to, magnetic tape cassettes, flash memory cards, DVDs, digital video tape, solid state RAM, and solid state ROM. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer-readable instructions, data structures, program modules, and other data for the computer 110. In FIG. 1, for example, hard disk drive 141 is illustrated as storing an operating system 144, application programs 145, other program modules 146, and program data 147. Note that these components can either be the same as or different from the operating system 134, application programs 135, other program modules 136, and program data 137. The operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball, or touch pad. Other input devices (not shown) may include a microphone, joystick, game pad, satellite dish, and scanner. These and other input devices are often connected to the processing unit 120 through a user input interface 160 that is coupled to the system bus, but may be connected by other interface and bus structures, such as a parallel port, game port, or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN)

173, but may also include other networks such as a personal area network (PAN). Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or via another appropriate mechanism. In a networked environment, program modules depicted relative to the computer 110, or portions thereof, may be stored in a remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

Sensing Network Media Events

The sections following this one discuss how computer systems may respond when they sense network media events. This section provides information about the events themselves.

Figure 2:
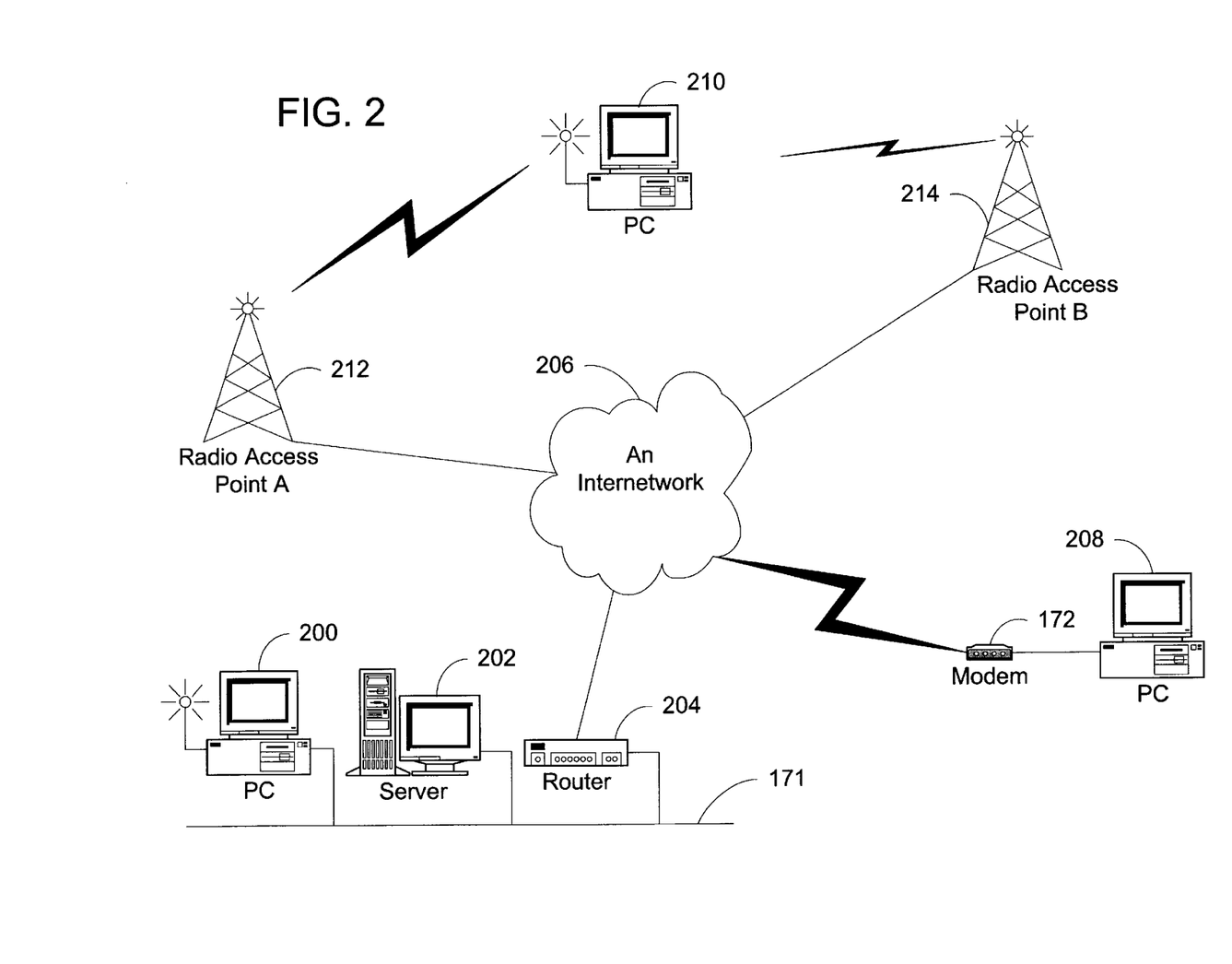
FIG. 2 shows a community of computer systems connected by multiple networks.

In FIG. 2, several computer systems with different communications mechanisms are configured to communicate with one another. While FIG. 2 shows all of the computer systems as resembling the general-purpose computer 110 of FIG. 1, they may in practice range from multiprocessor mainframes to personal digital assistants, telephones, set top boxes for televisions, etc. A LAN 171 connects a first PC 200, a server 202, and a router 204. The router also has a communications link to an internetwork 206 which may be a corporate intranet or the Internet. A second PC 208 connects to the internetwork 206 by way of a dial-up modem 172 and telephone line. A third PC 210 uses wireless technology to communicate. The wireless technology may be, for example, infrared or optical, but this example portrays a radio connection. Two radio access points, 212 and 214, are connected to the internetwork 206 and may enable the third PC 210 to communicate with the other computer systems connected to the internetwork. The first PC 200 can also communicate via wireless means, in addition to using the LAN 171.

According to one aspect of the present invention, network logic within a computing device constantly monitors the characteristics of the physical medium that links the device to a network. Very generally, when that logic senses a change in the medium's characteristics, the logic reacts, possibly changing the way the device connects to the network. Also, the network logic informs applications running on the device of the change so that they may react appropriately. The following examples of network media events aid in understanding the teachings of the present invention. Sections following this one describe in detail responses to the sensed change, both from the network logic and from the applications.

In a first example, assume that the PC 200 is monitoring its link to the LAN 171 for the most fundamental of network media events: a media disconnect. In a media disconnect event, all incoming and outgoing traffic fails on the link. The manner in which a disconnect event is sensed may vary with the type of link. On some links, the PC may sense the disconnect immediately while in others, the PC may not know until a certain amount of time passes without detectable activity on the link. In any case, the response is usually the same with the PC first attempting to reconnect to the network over the link. Failing that, the PC might attempt to communicate over another link. This particular PC may try the latter strategy because it has a radio transmitter. With the LAN inaccessible, the PC may be able to reroute its traffic to Radio Access Point A 212 and then on to the other devices.

The complement of a media disconnect event is a media connect event. The PC 200 may note that its connection to the LAN 171 is now working again. If that connection is faster or cheaper than the PC's radio link, the PC 200 may reroute its traffic off the radio link and back onto the LAN. In one embodiment of the present invention, the PC 200 keeps track of how long the link was disconnected. If the disconnect period was very short, then the PC proceeds to use the link as if nothing happened. For longer disconnects, however, procedures running on the PC or on other devices may have timed out. In such a situation, the PC needs to reestablish the network link as if it were connecting for the first time. Devices that are not always connected to a network, such as the PC 208 that dials in, must go through this new connection routine whenever they access a network. To complicate matters, the PC cannot always assume that the network to which it is now connected is the same network to which it was connected before the media disconnect event. In one embodiment of the present invention, the PC performs some type of discovery to learn the nature of the newly connected network.

Wireless complicates these simple scenarios of media disconnect and connect events. Assume that the PC 210 is using its transmitter to access devices via Radio Access Point A 212. Assume also that the PC 210 is moving away from Radio Access Point A toward Radio Access Point B 214. While moving, the PC monitors the strength of the signals coming from the two radio access points. The strength of Radio Access Point A's signal could suddenly go to zero which would be analogous to the LAN media disconnect event discussed above, but it is much more likely that the signal will gradually fade. Sensing the fade, the PC may try to disconnect from Radio Access Point A and connect to Radio Access Point B even while the signal from Radio Access Point A is still tolerable. Thus, a wireless link is susceptible to more than simple media disconnect and connect events because the wireless link is not just "up" or "down" but may be "better" or "worse" or "mostly the same" as one or more other available links. A wireless computing device may need to closely monitor all available links in order to make intelligent transmission choices.

This radio scenario hints at more complications of wireless communications. A wired device usually knows how many connections it can have: at most, one per network interface. A wireless device, on the other hand, has a potential connection to each access point whose signal strength is above a given threshold and these access points may appear and disappear unpredictably. This exacerbates the problem mentioned above in relation to wired networks: a connect following a disconnect need not be to the same network. In one embodiment of the present invention, wireless links are checked to see to what they are connecting.

Going beyond media disconnect and connect events, network logic may detect a change in the error rate of data transmitted over the link. This may be due to link degradation, such as when a standard telephone line gets wet, when a radio access point moves farther away, or when a radio link suffers from increased interference. The increased error rate may also be caused by a defective network interface card connected to the network, or may simply be a result of increased traffic loads on the network. If the detected error rate exceeds a certain amount, then the network logic may look to use another network link, even though the current link is not in any sense disconnected.

The effective data rate that a computing device gets from a network link may decrease, independently of any increase in the error rate on the link. This may be due to increased use by others of a shared link or by link logic changing the link's transmission characteristics to accommodate changes in its operating environment. The response could well be the same as for an increased error rate: the network logic could search for another link.

Devices may want to respond to changing conditions before they result in actual errors. For example, network logic may sense that the response time on a network link is increasing substantially, although it is still within the parameters formally defined as acceptable for this type of network link. By definition, this is not an error condition, but the network logic may still use this information in considering whether to send traffic by a different route.

Other types of media events can be sensed including a change in the latency experienced by packets traversing the network, a change in the variation in latency (jitter), a change in the maximum packet size allowed on the network, etc. Responses can be developed for many of these events.

The above examples begin to show the richness of the information available to a device that is critically aware of the state of its network media. The following sections build on this richness to show some of things that can be done with this information.

An Implementation of the Network Logic

Figure 3:
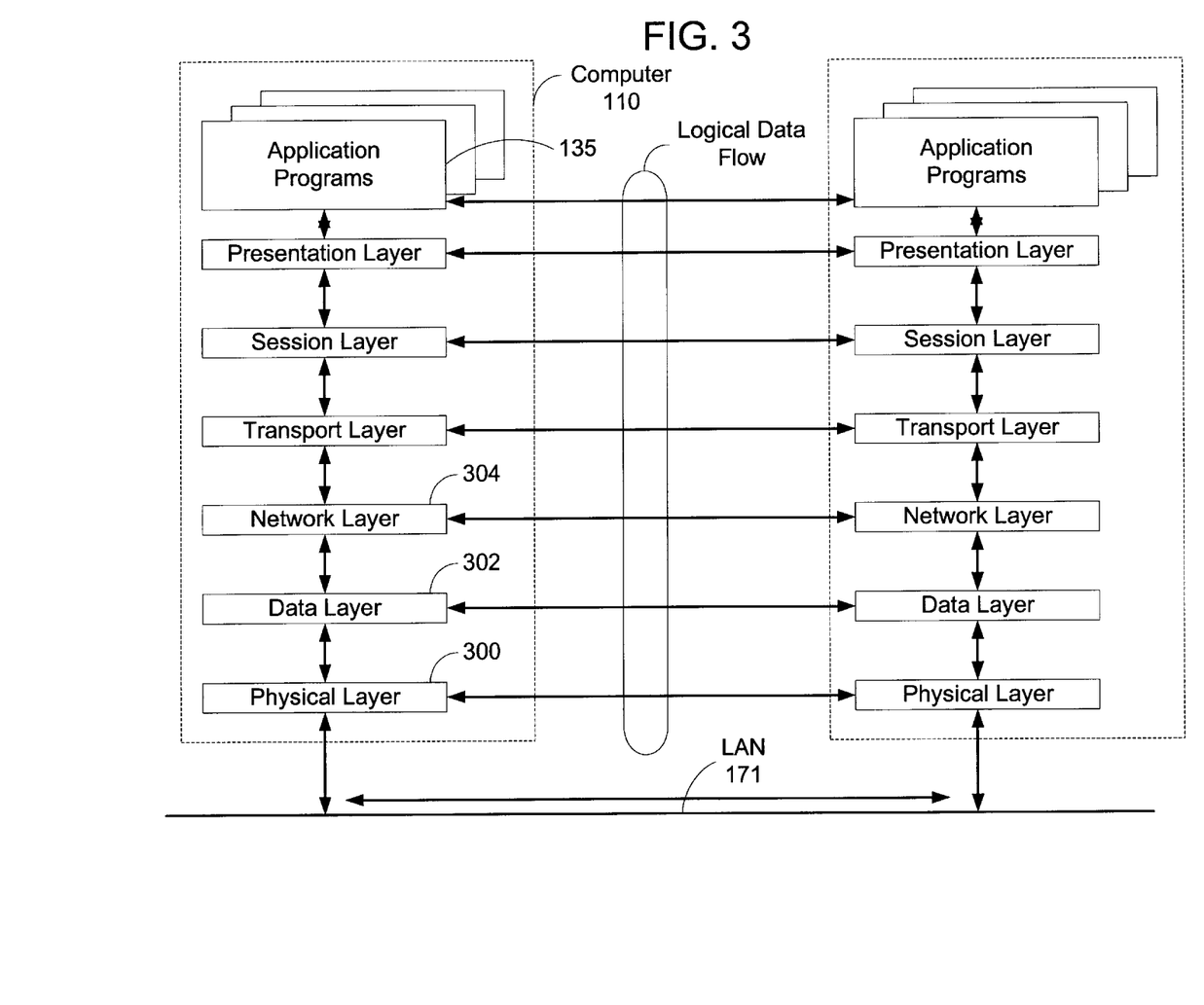
FIG. 3 presents the International Standards Organization Open Systems Interconnection (ISO/OSI) model for hierarchically-layered network communications protocols.

Before detailing how the network logic responds to network media events that it senses, it may help to have in mind one particular embodiment of that network logic. On each computing device in FIG. 2, network logic implements the communications protocols used. Many, but not quite all, of today's communications protocols follow the International Standards Organization Open Systems Interconnection (ISO/OSI) protocol model shown in FIG. 3. In this model, the overall task of enabling network communications is divided into subtasks and those subtasks are each assigned to a logical layer in the protocol stack. The stack is hierarchical: each layer has a defined interface with the layers above and below it. Logically, each layer communicates with its peer layer on another computer, provides services to the layer above it in the stack, and uses the services provided by the layer below it. Physically, data flow down the stack from their originator until the physical layer 300 actually transmits them across the medium of the network connection, shown here as a LAN 171. When the data are received by the target computer, they are passed up the stack with each layer stripping off and responding to the data meant for it while passing the rest of the data up to the next level. For example, the network layer 304 defines how data are routed among networks. The network layer on one computer logically speaks with the network layer on another computer by passing a packet of data down to the data layer 302 on its own computer. The data layer in turn adds a header to the network layer's packet thus creating a data frame which it passes to the physical layer. The physical layer uses the physical network medium to transmit that data frame. When the data frame is received by the target computer, the target's data layer reads the data frame, stripping from it the header information meant for its own use. Then the data layer takes the rest of the frame, consisting of the originator's data packet, and sends it up to the network layer. Thus, the network layer on the target reads the data as sent by the network layer on the originator without having to decode the data layer header and other information used by the lower layers to transmit that data packet.

The primary advantage of this scheme is that application programs 135 can communicate with each other without concerning themselves with the myriad details of establishing and maintaining a network connection. Protocol layers find the remote application programs with which the originating application program wishes to speak, retransmit information damaged during transmission, ensure that information is received in order, reroute information when communications links fail, and do all the other tasks necessary to present as flawless as possible a connection to the application programs.

It should be remembered that the ISO/OSI protocol stack is a conceptual model only and that no protocol follows it exactly. However, many popular protocols in use today follow this model to a greater or lesser extent and the model makes discussion of the communications tasks it defines more easily comprehendible.

Figure 4:
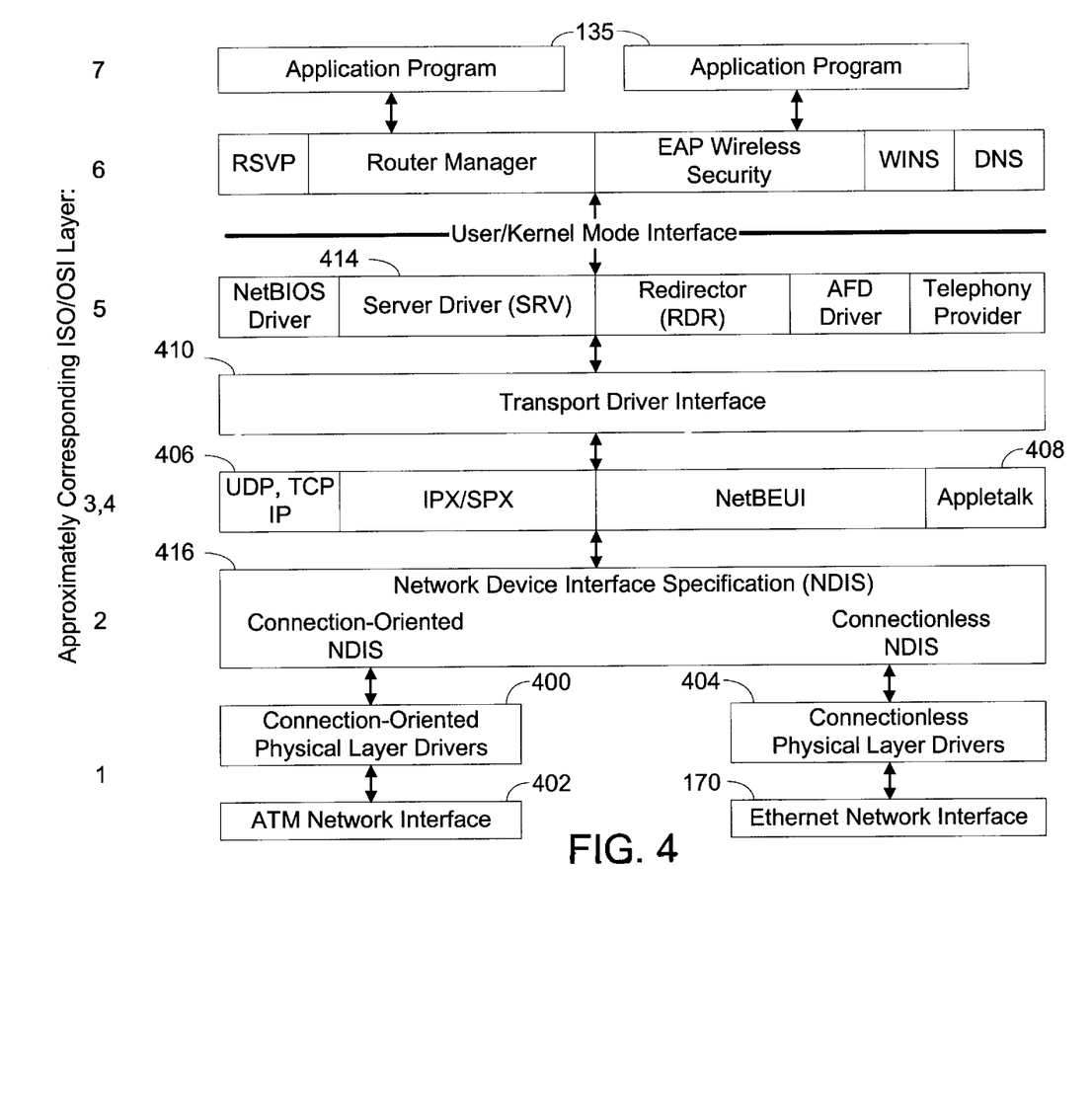
FIG. 4 is an example of how ISO/OSI communications protocols may be implemented on a computer system.

The ISO/OSI model, however, does nothing to specify the actual implementation of the network logic behind those communications tasks. FIG. 4 illustrates an embodiment of how the network communications tasks are performed within Microsoft's "WINDOWS" operating system. This embodiment is useful for illustrating how the network logic responds to sensed media events, as described in the next section. In this embodiment, communications flow up and down between layers that are closely analogous to the layers of the ISO/OSI model. The network logic comprises everything below layer 7, here represented by the application programs 135. For the moment, note that there is often more than one communications task at a given layer. ISO/OSI's physical layer 300 is divided in this implementation between connection-oriented physical layer drivers 400, such as for the Asynchronous Transfer Mode 402, and connectionless physical layer drivers 404, such as for Ethernet 170. Again, one computer may simultaneously implement two sets of ISO/OSI levels 3 and 4, once as the Transmission Control Protocol (TCP) running over the Internet Protocol (IP) 406, and once as the Appletalk protocol 408. This redundancy gives to the network logic the flexibility to reroute information from one protocol stack to another when it senses a disruption in the service provided by one of the stacks.

Actions of the Network Logic in Response to Network Media Events

According to one embodiment of the present invention, having sensed one of the several types of network media events discussed above, the network logic analyzes that event and responds in a manner calculated to best preserve effective communications. The response varies not only with the event, but with the existing communications environment, with the computing device on which the network logic is running, and with the specific implementation of the network logic. This section details responses to some events, taking examples from one possible implementation of the network logic. For purposes of illustration, the computing device is taken to be the general-purpose computer 110 of FIG. 1, connected to a TCP/IP network 171. In general, however, the computing device may be any device connected to any network, such as a networked printer or even a telephone, etc.

On a Media Disconnect Event

In a preferred embodiment, when a physical layer driver (404 in FIG. 4) detects that its network media has been disconnected, it passes a notification of the event up the protocol stack to the Network Device Interface Specification (NDIS) 416. NDIS uses the IPStatus callback function to pass the notification to the TCP/IP driver 406.

At this point, the TCP/IP driver 406 may choose to wait for a short time and then query the lower protocol levels for the status of the network connection media. If the problem has been cleared up, then the TCP/IP driver need do nothing more. This strategy smoothes out transient problems without having to inform the application programs 135.

If the computing device 110 is equipped with more than one network interface (as is the case, for example, with the PC 200 in FIG. 2), then the network logic attempts to reroute traffic intended for the failed network interface 170 to another network interface. In one embodiment of the present invention, this reroute is done entirely within the protocol stack, transparently to the application programs 135. Note, however, that even if traffic can be rerouted, the TCP/IP driver 406 may choose to remove the address (or mark it unusable) and give an "IP address deletion" notification. This allows media sense aware applications to synchronize to the new state, if necessary. For example, routing software can respond to an immediate notification of a media disconnect or connect event. The routing software can then use its routing protocol to tell other routers about the event.

If a second network interface is available, the network logic may need to perform one or both of the following operations, in addition to rerouting traffic.

Automatic Virtual Private Network (VPN) Failover. If a tunnel to a server was set up over the failed network interface 170, a new tunnel may be set up over the second network interface. This requires more than a simple change to the routing table. The tunneling client software must run the tunnel setup logic with the same (if accessible and preferable) or with another tunnel server. The tunneling client software may be configured with the name or address of the other tunnel server, or it may query the DNS over the second network interface.

Automatic Address Failover. If the second network interface connects to the same network as did the failed network interface 170, then the second interface can move from being passive (connected to the network but with no address) to being active by taking over the address of the failed network interface. Even if the second interface was active before the failure, it can still take the address of the failed interface. This makes the disconnect event transparent to the end stations communicating with this computing device via the failed-over TCP/IP address.

If the problem persists and traffic cannot be transparently rerouted, then the TCP/IP driver 406 removes the TCP/IP address associated with the failed network interface 170 and passes an "IP address deletion" notification up the stack. Application programs 135 receive that notification through the Transport Driver Interface (TDI) 410, IPHLPAPI callbacks, the Winsock API, or Microsoft's Windows Management Instrumentation (WMI). The notification allows users of the TCP/IP protocol stack to operate in the "network unreachable" mode.

The next section describes other responses taken by application programs when they receive this notification.

On a Media Connect Event

Notice of the event is passed up the stack, just as in the case of a media disconnect event, described immediately above. When notice reaches the TCP/IP driver 406, that driver requests either a DHCP renew or a DHCP discover, the choice depending on whether the driver has a non-expired or an expired lease at the time of the media connect event. The TCP/IP driver gets an IP address and another network configuration (which may either be a renewal of the configuration existing prior to a media disconnect event or may be a new one). The driver then passes up the stack an "IP address added" notification. Higher-level protocol drivers respond to this notification by tuning their behavior to use the new network connection in the most optimal manner possible. Some application programs 135 (those that are not media sense aware) may not recognize the notification; they might have to be restarted to ensure that they use the new network configuration.

If the computing device 110 were disconnected from one network and then connected to another, its DHCP renew or discover request would be answered with a NACK from the new network's DHCP server. The computing device then gets a new address and configuration from the new network's DHCP server.

If the computing device has a statically configured address, then there is normally no need for a DHCP renewal or discovery. The static address is simply replumbed to make the protocol stack operational on the newly connected network interface. In the case of a disconnect from one network followed by a connect to another, however, the computing device can discover to which network it is connected by sending a DHCP discover. If the computing device determines that it is on a different network from the one for which it is configured, it can decide to stay in the disconnected state, go into the auto-net state to order to gain connectivity to other auto-net machines, or simply take the returned DHCP address. A stored policy can tell the computing device which action to take in this situation.

Once the computing device has discovered and plumbed its new network configuration, it can proceed as follows. The computing device rejoins the IP multicast groups it was in before the media disconnect event. There are two types of groups to join—permanent and temporary. The "all hosts multicast" and "all routers multicast" groups are examples of permanent groups that all hosts and all routers, respectively, must join. Temporary groups are those that a computing device joins as a result of a request from an application program. On a media connect event, the computing device automatically joins the permanent groups when the protocol stack is initialized as part of the address plumbing. Media sense aware application programs can then request that the computing device rejoin its temporary groups.

If IPSEC policies were in effect on the computing device, then they should be plumbed correctly. For example, for the IPSEC policy:

from/to me to/from <IP addresses or wild card>, use
        3DES encryption and MD5 authentication if the IP address changes as a result of the media connect event, "me" in this IPSEC policy would expand to include the new IP address. This ensures that no information leaks as a result of the change from the former network to the new.

If a quality of service (QOS) policy of the type:

from me to <IP address>, use xx bits/second were in effect on the computing device, then the computing device sends RSVP requests for service guarantees of bandwidth on the network and on the destination. This is done even if the computing device were disconnected and then connected back to the same network because the state kept by network elements such as routers may have timed out between the two media events.

If the computing device is "ICMP router discovery enabled," then it sends router discovery requests in order to discover the routers on the network. Similarly, the computing device discovers if other servers and services are available on the new network.

Clusters of computers can be configured to share a processing load and to provide redundancy in the face of one computer's failure. Control traffic between nodes in a cluster is often sent over a private network while client traffic goes over a public network. This adds a level of security to the private communications and avoids using up the bandwidth of the public network. If the private network becomes disconnected, however, the clusters can switch their control traffic to another private network, if available, or to the public network. When the private network is reconnected, control traffic can be switched back to it.

On a Change in Carrier Strength Event

As discussed above, a wireless computing device 210 moving away from one radio access point (RAP) 212 toward another 214 will probably notice a degradation in the signal strength of the former RAP while the strength of latter's signal increases. The computing device need not wait for an actual media disconnect on the RAP it is using but can anticipate it and respond by scanning for other RAPs. Upon notification of a change in signal strength, the protocol drivers respond as if they sensed both a media disconnect from the old RAP and a media connect to the new RAP. Higher-level protocol drivers and applications are informed just as described above. In addition, the following actions are taken:

On choosing to connect to a new RAP (a virtual media connect event), the computing device sends three "EAP start authentication" messages to the new RAP to determine whether it supports authentication, such as by use of the IEEE 802.1X protocol. If so, then the computing device completes the authentication process, else it assumes that it is connected to an unauthenticated network.

Once the computing device is authenticated (or decides it is on an unauthenticated network), it starts the DHCP protocol to get its address and network configuration. Subsequent steps are the same as explained above for real media connect events.

On Other Network Media Events

Other network media events described above in the section entitled "Sensing Network Media Events" include a change in the error rate on the communications link, a change in the effective throughput on the link, and a change in the response time of some other device on the network. The same principles described above can be used to enable the network logic to respond to these other network media events.

Actions of Applications upon Notification of Network Media Events

As described above, sometimes the network logic can respond to a network media event in such a manner that the application programs need never know of the event. More generally, however, the application programs are informed so that they may try to alter their operations in response to the changed circumstances caused by the event.

On a Media Disconnect Event

An application program may choose to close down if it cannot operate without network access. On the other hand, some application programs may continue to perform as best as they can while waiting to take advantage of a possible reconnect event in the near future. If the original network connection cannot be reestablished, these applications are also ready to quickly take advantage of a new network connection if one becomes available.

Some application programs may not recognize the notification of a media disconnect event and so cannot immediately respond to the new circumstances. However, as soon as they attempt an operation on the failed network connection, they will receive a "network disconnected or unreachable" error and can then respond appropriately.

On a Media Connect Event

The application program changes its state from "network unreachable" to "network re-initializing" or "network initializing" and goes through network initialization. This involves re-registering names and multicast groups on the new network. (Note that the state becomes "initializing" if the application has never been initialized. The state becomes "re-initializing" if the application had been initialized before. Re-initialization may entail the same or a subset of the actions performed for initialization.)

Because applications vary widely in purpose one from another, they also vary widely in how they respond to changes in network connectivity. Some specific examples are given below.

An Internet browser application may query the new network configuration received from the DHCP server to see if the network contains a proxy server. If so, the browser can set itself up to use the proxy server.

The DNS Resolver service caches DNS server addresses so it is important that it notes any changes in those addresses. The new network configuration received from the DHCP server has this information.

The NetBIOS client (NetBT) notes changes to the WINS server addresses (also found in the new network's DHCP configuration) and uses those new WINS servers for NetBIOS name registrations, releases, and queries.

The printer service notes changes to the printer addresses (also found in the new network's DHCP configuration) and uses the new printers for servicing print requests.

An application program that receives a multicast stream via the Scalable Reliable Multicast mechanism may check to see if the available bandwidth on the new network connection is lower than it was on the previous network connection. If so, the application may inform the sending application so that it can throttle the send rate and thus avoid data loss within the network and subsequent retransmissions. In a like manner, an application sending a multicast stream may check the availability of bandwidth on the new network connection and adjust its send rate accordingly.

While the computing device was not connected to the network, a logon service may have granted access to a user on the basis of cached credentials. On reestablishing the network connection, the logon service can query a security server for the logon credentials.

The embodiments described above are illustrative only and are not intended to limit the scope of the present invention. In particular, the embodiments describe the invention with respect to TCP/IP networking technologies and with respect to Microsoft "WINDOWS" operating systems but the invention applies as well to other networking technologies and to other computer technologies. Therefore, the invention as described herein contemplates all such embodiments as may come within the scope of the following claims and equivalents thereof.

We claim:

1. Executing on a computer attachable to a network, a method for responding to media sense events concerning the network, comprising:

detecting when the computer loses connectivity to the network;

setting network protocol parameters in response to the loss of connectivity;

informing a software module on the computer of the loss of connectivity so that the software module may reconfigure itself in response to the loss of connectivity;

detecting when the computer gains connectivity to the same or to another network;

discovering parameters of the newly connected network;

setting network protocol parameters to configure the connectivity to the newly connected network, said parameters including at least one discovered parameter other than the network address; and informing the software module of the new connectivity so that the software module may reconfigure itself in response to the new network.

2. The method of claim 1 wherein the software module is a higher-level protocol driver.

3. The method of claim 1 wherein the software module is an application.

4. The method of claim 1 wherein discovering includes communicating over the newly connected network to find available servers and services.

5. A computer-readable medium having computer-executable instructions for performing the method of claim 1.

6. Executing on a computer attachable to a network, a method for responding to a network media event occurring on the medium of the network, comprising:

detecting the network media event, wherein the network media event is selected from the group consisting of: change in carrier strength, change in error rate, change in data rate, change in maximum packet size allowed on the network, change in jitter, and change in latency;

adjusting network protocol parameters to accommodate to the changed circumstances brought about by the network media event;

informing a higher-level protocol driver of the network media event; and informing an application of the network media event so that it can reconfigure itself to respond to the network media event.

7. The method of claim 6 further comprising:

responding to commands from the higher-level protocol driver and from the application to change network protocol parameters.

8. The method of claim 6 wherein adjusting causes network communications traffic to be routed to a network medium other than the one on which the network media event occurred.

9. The method of claim 6 wherein adjusting causes network communications traffic to be routed to the network medium on which the network media event occurred.

10. The method of claim 6 wherein the application is a routing application.

11. A computer-readable medium having computer-executable instructions for performing the method of claim 6.

12. A computer-readable medium having computer-executable components comprising a protocol driver that (1) detects an event occurring on a network communications medium, the event changing circumstances of communications on the network communications medium, the event selected from the group consisting of: change in carrier strength, change in error rate, change in data rate, change in maximum packet size allowed on the network, change in jitter and change in latency, (2) adjusts parameters in response to the circumstances changed by the event, and (3) informs an application of the event.

* * * * *